US006278255B1

(12) United States Patent
Yoo et al.

(10) Patent No.: US 6,278,255 B1
(45) Date of Patent: Aug. 21, 2001

(54) APPARATUS AND METHOD FOR ELIMINATING VARIABLE OFFSET VALUES OF CURRENT DETECTING SIGNALS

(75) Inventors: Ho-sun Yoo, Sungnam; In-su Yang, Seoul, both of (KR)

(73) Assignee: Samsung Electronics Co., Ltd., Suwon-City (KR)

( * ) Notice: Subject to any disclaimer, the term of this patent is extended or adjusted under 35 U.S.C. 154(b) by 0 days.

(21) Appl. No.: 09/495,479

(22) Filed: Feb. 1, 2000

(30) Foreign Application Priority Data

Feb. 2, 1999 (KR) ................................... 99-3412

(51) Int. Cl.⁷ ................................ H02P 5/28; H02P 7/36
(52) U.S. Cl. ........................ 318/798; 318/806; 318/609; 318/599; 700/41; 700/75
(58) Field of Search ................................ 318/798–806, 318/811, 609, 599, 632, 568.22; 700/40, 41, 54, 55, 75, 28; 388/906, 910

(56) References Cited

U.S. PATENT DOCUMENTS

| 4,413,212 | * | 11/1983 | Okamoto et al. ................. 318/317 |
| 4,719,400 | * | 1/1988 | Kurakake et al. ................. 318/811 |
| 5,053,688 | | 10/1991 | Rees . | |
| 5,319,294 | | 6/1994 | Ohta et al. . | |
| 5,407,027 | * | 4/1995 | Suzuki et al. ..................... 187/277 |
| 5,650,708 | * | 7/1997 | Sawada et al. .................... 318/801 |
| 5,780,989 | * | 7/1998 | Matsumoto ........................ 318/632 |
| 5,811,957 | * | 9/1998 | Bose et al. ........................ 318/802 |
| 5,870,297 | * | 2/1999 | Dahler et al. ..................... 363/95 |

FOREIGN PATENT DOCUMENTS

| 1-218373 | | 8/1989 | (JP) . | |
| 2-114972 | | 4/1990 | (JP) . | |
| 3-12705 | | 1/1991 | (JP) . | |
| 3-78479 | | 4/1991 | (JP) . | |
| 4-71035 A | * | 3/1992 | (JP) ............................ G06F/11/08 |
| 5-91780 | | 4/1993 | (JP) . | |
| 5-282100 | | 10/1993 | (JP) . | |
| 7-333260 | | 12/1995 | (JP) . | |
| 9-271189 | | 10/1997 | (JP) . | |

* cited by examiner

Primary Examiner—Bentsu Ro
Assistant Examiner—Edgardo San Martin
(74) Attorney, Agent, or Firm—Burns, Doane, Swecker & Mathis, L.L.P.

(57) ABSTRACT

An apparatus for eliminating variable offset values of current detecting signals and its method having a current detector for detecting feedback current from a three-phase AC motor and for converting the feedback current into voltage detecting signals containing offset elements, differential amplifiers for differentially operating a feedback analog offset signal and the voltage detecting signals, output amplifiers for amplifying the differentially operated voltage detecting signals to fit within the input range for controlling, an analog/digital converter for converting the amplified signals into digital signals, a control part for adding up the digital signals to a digital offset value and for comparing the digital offset value with a predetermined offset command and for applying a proportional plus integral function to the compared result and for outputting a digital offset signal of a pulse-width modulation waveform, and a digital/analog converter for converting the digital offset signal into the analog offset signal and for providing a feedback loop of the analog offset signal to the differential amplifiers. The disclosed invention can adjust a current detecting signal to a desired level of signal even though the offset element which is contained in the detecting signal of a motor such as a current detecting signal of the ASIPM is being variably changed.

21 Claims, 7 Drawing Sheets

APPARATUS AND METHOD FOR ELIMINATING VARIABLE OFFSET VALUES OF CURRENT DETECTING SIGNALS

BACKGROUND OF THE INVENTION

1. Field of the Invention

The present invention relates to a control system of an alternating current motor. More particularly, the present invention relates to an apparatus and method for eliminating variable offset values within current detecting signals of a device known as an Application-Specific Intelligent Power Module (hereinafter ASIPM) for a control system of a three-phase alternating current (AC) motor.

2. Description of the Prior Art

The ASIPM is a recently developed device used in controlling the operation of an AC motor. Applicants expect the ASIPM to become a widely accepted control device for next generation AC motors. However, difficulties exist in using ASIPMs with certain types of AC motors. The output signals of a current sensor/detector embedded in the ASIPM often contain variable current offset elements. As a result, the ASIPM may not be easily adapted to some types of AC motor systems since the current offset elements may cause performance reductions in motors containing a torque reduction control, ripple generating control, or the like. In these types of AC motors, the offset is called steady-state deviation or vestigial deviation, and represents a deviation from a desired value even after the control system has recovered to a steady state. Ripple represents an alternating element of a DC output when a rectifier converts an alternating current into direct current.

FIG. 1 is a schematic diagram of a conventional apparatus for eliminating variable offset values of current detecting signals. The conventional apparatus has an ASIPM 1 for detecting feedback currents and associated phases of a three-phase AC motor, and for converting the feedback current and associated phase signals into voltage detecting signals which may contain offset elements, that is, current detecting signals. After determining the phases U and W, the phase V may be calculated, since it is known that the current of the three phases sums to zero. The ASIPM 1 outputs the voltage detecting signals to a CPU 4 via output amplifiers 2, 3. The output amplifiers 2, 3 amplify signals associated with the phases U and W of the voltage detecting signals so as to fit within the input range of a central processing unit (hereinafter CPU) 4. An analog/digital converter 4a within CPU 4 converts the amplified signals of phases U and W into digital signals. The CPU 4 contains a number of adders 4b, 4c, and 4d for adding predetermined offset commands to the digital signals of phases U and W.

As shown in FIG. 1, the conventional apparatus typically needs two current sensors corresponding to the voltage detecting signals at outputs CU and CW, for eliminating variable offset values of current detecting signals. A conventional apparatus may, for certain configurations, require three current sensors corresponding to CU, CW and CV. The conventional apparatus also requires amplifiers 2, 3 for amplifying the current detecting signals, and may require a third amplifier, as well. The current detecting signals through the amplifiers 2, 3 are outputted to the analog/digital converter 4a which is typically embedded in the CPU 4, but may alternatively be independent of the CPU 4. The ASIPM 1 typically functions as a current sensor in addition to functioning as a power device for supplying power to the three-phase AC motor. When the ASIPM 1 functions as a power device, its current sensors are not needed.

FIG. 2 is a flow chart of a conventional method for eliminating variable offset values of current detecting signals. The conventional method of FIG. 2 will be explained with reference to the structure of the apparatus shown in FIG. 1.

In step S01, it is determined whether the ASIPM 1 is being driven in response to the operation of a three-phase motor. If the ASIPM 1 is not being driven, the S01 step proceeds to the end of the method. Otherwise the method proceeds to step S02 where the current and associated phases U and W of feedback signals are detected. The method then proceeds to step S03 in which the current and associated phases U and W are converted into voltage detecting signals containing offset elements, or current detecting elements. After generating the voltage detecting signals in step S03, the method proceeds to step S04 where the phases associated with signals U and W are amplified so as to fit within the input range of the CPU 4. The method then proceeds to step S05, where each current detecting signal (i.e., voltage detecting signal which has an offset element) is converted into a digital value by the analog/digital converter 4a. The method proceeds to step S06, where the CPU 4 calculates the phase associated with the current of signal V. The phase of V may be calculated because it is known that the phases of the three signals U, W and V must sum to zero. The method proceeds to step S07 in which is determined whether the steps S02 through S06 have been performed a predetermined number of times. If the steps S02 through S06 have not been performed a predetermined number of times, the method proceeds from step S07 back to step S02. Upon ascertaining, in step S07, that the steps S02 through S06 have been performed a predetermined number of times, the method proceeds to step S08 where the average value of the voltage detecting signals is determined. In step S09, the CPU 4 stores the average value from step S08 into a memory, and then proceeds to step S10. In step S10, the method proceeds to step S11 if it is determined that the ASIPM 1 is presently being driven, otherwise the method ends. In step S11, the offset elements are eliminated from the current data. Thus, the method of a conventional apparatus results in the current offset elements being eliminated by an initializing function of the CPU 4. The data of each current phase may then be used after eliminating the current offset elements as the ASIPM 1 is being driven.

U.S. Pat. No. 5,319,294, filed on May 24, 1993 ("Ohto et al.") discloses an apparatus for automatically adjusting offset correction values for current detectors. The Ohto et al. device can be used with the above-described conventional apparatus and can be adapted so that the offsets of each current detecting signal may be generated in response to temperature changes or the like while the servomotor is operating. In an AC servomotor, a torque ripple is generated when the offset element is contained within a current detecting signal. The Ohto et al. device seemingly eliminates the effects of torque ripple. Since a servo driver contains an encoder as a position detector, the offset elements contained in the current detecting signals can be calculated by use of a dynamic equation model of the position detector and the servomotor. It appears that phase current data can be acquired by repeatedly subtracting the data for each phase associated with current from the appropriate analog/digital converted current data.

A problem exists in the operation of the CPU of the Ohto et al. device which may result in overcompensation due to the computational lag in using the dynamic model of a motor. Another problem exists because the Ohto et al. device can only be adapted to a synchronous AC motor. In addition, the Ohto et al. device suffers the drawback of being susceptible to the errors of the synchronous motor model. In particular, when offset elements change dramatically, the current detecting signals are shifted up and/or down. This may cause the current detecting signals to deviate from the input range (for instance, from 0V to 5V) of an analog/digital converter. When this situation occurs in the Ohto et al. device, the synchronous motor will not generate the maximum torque.

U.S. Pat. No. 5,053,688 filed on Aug. 16, 1990 ("Rees") discloses a feedback circuit for eliminating DC offset in the drive current of an AC motor. The Rees device appears to rely on the addition of complex hardware to pre-eliminate current offset elements which are contained in signals outputted from a current detector. The offset-eliminated signals then seem to be used as input signals of an analog/digital converter. The Rees device, which controls a motor using chopped-pulse rows as signal sources, may be adapted to brushless DC motors. The Rees device uses a chopper which switches on/off for chopping pulses to convert DC signals into AC signals to control the brushless DC motor by means of the chopped-pulse rows. A circuit for reducing current offset contained in current detecting signals is attached at output ports of the output amplifiers, e.g., the outputs of amplifiers 2 and 3 of FIG. 1. Current offset elements contained in signals detected by current sensors are reduced by external hardware including analog switches, a counter, an integral circuit, or the like. Then the offset-eliminated current signals can be used as input signals of an analog/digital converter.

It seems that the Rees device for eliminating current offset can be set to arbitrarily eliminate a particular effect value, but cannot be adapted to offset elements which are dynamically changing due to temperature variations or the like, while the motor is operating. Since the offset elements in the current detecting signals must be properly modeled by a dynamic model for a motor and a generated ripple, a problem arises in the Rees device in which the arithmetic and logic operations of the CPU may result in over-compensation or under-compensation. Thus, the Rees device suffers from the drawback that it may only be operated accurately in special situations due to its dependance on the accuracy of a dynamic model.

SUMMARY OF THE INVENTION

The present invention has been designed to overcome the above problems and deficiencies. Accordingly, one objective of the present invention is to provide an apparatus for eliminating variable offset values of current detecting signals. The present invention is capable of eliminating the effect of offset generated by a current sensor by means of using an inner or outer peripheral circuit of a commercial CPU and a micro controller.

Another objective of the present invention is to provide a control system of a three-phase AC motor with Ln apparatus for eliminating current offset. This is realized through use of a microcircuit of a servo driver or an inverter which eliminates variable offset values of current detecting signals being adapted for the ASIPM device.

To achieve the above objectives, the present invention provides an apparatus for eliminating variable offset values of current detecting signals, made up of means for detecting feedback current from an AC motor, and for converting the feedback current into voltage detecting signals containing offset elements; means for differentially amplifying a feedback analog offset signal and the voltage detecting signals; means for converting the differential amplified analog signals into digital signals; a control means for adding up the digital signals to a digital offset value, and for comparing the digital offset value with a predetermined offset command, and for applying a proportional plus integral function to the compared result, and for outputting a digital offset signal of a pulse-width modulation (hereinafter PWM) waveform: and means for converting the digital offset signal into the analog offset signal, and for doing a feedback of the analog offset signal to the means for differential amplifying.

The means for detecting current may be an Application-Specific Intelligent Power Module (ASIPM) which simultaneously functions as a power device supplying power to the AC motor.

The means for differentially amplifying is made up of differential amplifiers for differentially operating the feedback analog offset signal and three-phase voltage detecting signals; and output amplifiers for amplifying the differentially operated signals in order to fit within an input range of the control means. The differential amplifiers have a first differential amplifier for differentially operating the feedback analog offset signal and a signal of phase U among the three-phase voltage detecting signals; a second differential amplifier for differentially operating the feedback analog offset signal and a signal of phase V among the three-phase voltage detecting signals; and a third differential amplifier for differentially operating the feedback analog offset signal and a signal of phase W among the three-phase voltage detecting signals.

The means for converting analog signals into digital signals may be embedded in the control means.

The control means is made up of a first adding part for adding up the digital signals being outputted from the means for converting analog signals into digital signals; a second adding part for subtracting an output of the first adding part from the predetermined offset command; a proportional plus integral controller for accompanying the proportional plus integral function according to an output of the second adding part, and for outputting the PWM waveform; and a counter for counting the pulse-width of the PWM waveform.

The predetermined offset command is set to a value described by the relationship $(3/2 \times 2^n)$ if the means for converting analog signals into digital signals adapts an unipolar mode. The variable n represents the number of bits. The predetermined offset command is set to 0 if the means for converting analog signals into digital signals adapts to a bipolar mode.

The proportional plus integral controller is made up of a proportional function part for changing an operating value in proportion to the offset elements; and an integral function part for making a new operating value, to add to the proportional function, by adding a changed value in proportion to an integral value of the offset value.

The digital/analog converting means is a filter amplifier for low-pass filtering the PWM waveform counted by the counter in the control means. The filter amplifier is filtering low-pass the PWM waveform being counted by the counter, integrates the filtered waveform, and converts the integrated waveform into the analog offset signal.

To achieve the above objectives, the present invention provides an apparatus for eliminating variable offset values of current detecting signals in a three-phase AC motor, made up of a current detector for detecting feedback current from the three-phase AC motor, and for converting the feedback current into voltage detecting signals containing offset elements; differential amplifiers for differentially operating a feedback analog offset signal and the voltage detecting signals; output amplifiers for amplifying the differential operated voltage detecting signals in order to fit within the input range for controlling; an analog/digital converter for converting the amplified signals into digital signals; a control part for adding up the digital signals to a digital offset value, and for comparing the digital offset value with a predetermined offset command, and for accompanying a proportional plus integral function according to the compared result, and for outputting a digital offset signal of a PWM waveform; and a digital/analog converter for converting the digital offset signal into the analog offset signal, and for doing a feedback of the analog offset signal to the differential amplifiers.

The differential amplifiers made up of a first differential amplifier for differentially operating the feedback analog offset signal and a signal of phase U among the three-phase voltage detecting signals; a second differential amplifier for differentially operating the feedback analog offset signal and a signal of phase V among the three-phase voltage detecting signals; and a third differential amplifier for differentially operating the feedback analog offset signal and a signal of phase W among the three-phase voltage detecting signals.

The digital/analog converter is a filter amplifier which low-pass filters a PWM waveform being counted by a counter in the control part, which integrates the filtered waveform, and then converts the integrated waveform into the analog offset signal.

To achieve the above objectives, the present invention provides a control system of a three-phase AC motor with an apparatus for eliminating current offset which is made up of a driver for driving the three-phase AC motor, wherein the driver contains a converter and an inverter; a power device for controlling the switching of the driver; a current detector for detecting feedback current from the three-phase AC motor, and for outputting three-phase voltage detecting signals; an eliminating apparatus of current offset for detecting offset elements contained in the three-phase voltage detecting signals, and for eliminating the offset elements; and a central processing unit for controlling the eliminating apparatus of current offset, and for outputting the three-phase current with the offset to the power device eliminated.

The eliminating apparatus of current offset is made up of differential amplifiers for differentially amplifying the three-phase voltage detecting signals and a feedback analog offset signal from the central processing unit; and a digital/analog converter for converting a PWM waveform being outputted by the central processing unit into the analog offset signal.

The central processing unit is made up of a first adding part for adding up the digital signals being outputted from the means for converting analog signals into digital signals; a second adding part for subtracting an output of the first adding part from a predetermined offset command; a proportional plus integral controller for accompanying a proportional plus integral function according to an output of the second adding part, and for outputting the PWM waveform; and a counter for counting a pulse-width of the PWM waveform.

To achieve the above objectives, the present invention provides a method for eliminating variable offset values of current detecting signals which has a first step for detecting feedback current from an AC motor, and for converting the feedback current into voltage detecting signals containing offset elements; a second step for differentially amplifying a feedback analog offset signal and the voltage detecting signals; a third step for converting the differentially amplified analog signals into digital signals; a fourth step for adding up the digital signals for a digital offset value, and for comparing the digital offset value with a predetermined offset command, and for accompanying a proportional plus integral function according to the compared result, and for outputting a digital offset signal of a PWM; and a fifth step for converting the digital offset signal into the analog offset signal, and for doing a feedback of the analog offset signal to the second step.

The second step has a first substep for differential operating the feedback analog offset signal and three-phase voltage detecting signals containing the offset elements; and a second substep for amplifying the differentially operated signals in order to fit within an input range for controlling.

The fourth step has a first substep for adding the digital signals being outputted from the third step; a second substep for subtracting an output of the first substep from the predetermined offset command; a third substep for accompanying proportional plus integral function according to an output of the second substep, and for outputting the PWM waveform; and a fourth substep for counting the pulse-width of the PWM waveform.

The predetermined offset command in the fourth step is set by the relationship of $(3/2 \times 2^n)$, if an analog/digital converter of the third step adapts to a unipolar mode, where the variable n is the number of bits used.

The predetermined offset command in the fourth step is set to 0, if an analog/digital converter for the third step adapts to a bipolar mode.

The third substep has a proportional function step for changing an operating value in proportion to the offset elements; and an integral function step for making a new operating value, to add to the proportional function, by adding a changed value in proportion to an integral value of the offset value.

The fifth step low-pass filters the PWM waveform being counted by a counter, and integrates the filtered waveform, and then converts the integrated waveform into an analog offset signal.

To achieve the above objectives, the present invention provides a control method of a three-phase AC motor with an apparatus for eliminating current offset which has a first step for driving the three-phase AC motor by means of a driver containing a converter and an inverter; a second step for controlling switching of the driver; a third step for detecting feedback current from the three-phases AC motor, and for outputting three-phase voltage detecting signals; a fourth step for detecting offset elements contained in the three-phase voltage detecting signals, and for eliminating the offset elements; and a fifth step for controlling the eliminating of offset elements, and for outputting an offset-eliminated three-phase current.

The fourth step has a first substep for converting a PWM waveform being outputted by a central processing unit into the analog offset signal; and a second substep for differentially amplifying the three-phase voltage detecting signals and a feedback analog offset signal, and for eliminating the offset elements.

The fifth step has a first substep for converting outputs of the fourth step into digital signals; a second substep for adding up the digital signals; a third substep for subtracting an output of the second substep from a predetermined offset command; a fourth substep for accompanying a proportional plus integral function according to an output of the third substep, and for outputting the PWM waveform; and a fifth substep for counting the pulse-width of the PWM waveform.

In the apparatus for eliminating variable offset values of the current detecting signals according to the present invention, a current detecting means detects feedback current from a three-phase AC motor, and converts the feedback current into voltage detecting signals containing offset elements. A differential amplifying means amplifies differentially a feedback analog offset signal and the voltage detecting signals containing offset elements. Next, an analog/digital converting means converts the differentially amplified analog signals into digital signals, and a control means adds the digital signals for a digital offset value, and compares the digital offset value with a predetermined offset command, and accompanies a proportional plus integral function according to the compared result, and outputs a digital offset signal of the PWM waveform. A digital/analog converting means converts the digital offset signal into the analog offset signal, and makes a feedback of the analog offset signal to the means for differentially amplifying. Accordingly, this invention forms a closed-loop by the differential amplifying means, the analog/digital converting means, the control means, and the digital/analog converting means, and then can eliminate the current offset elements.

BRIEF DESCRIPTION OF THE DRAWINGS

The above objects and advantages will be more apparent by describing the present invention with reference to the accompanied reference drawings, in which.

DETAILED DESCRIPTION OF THE PREFERRED EMBODIMENT

The present invention will become more apparent by detailed description of preferred embodiments with reference to the attached drawings.

Figure 1:
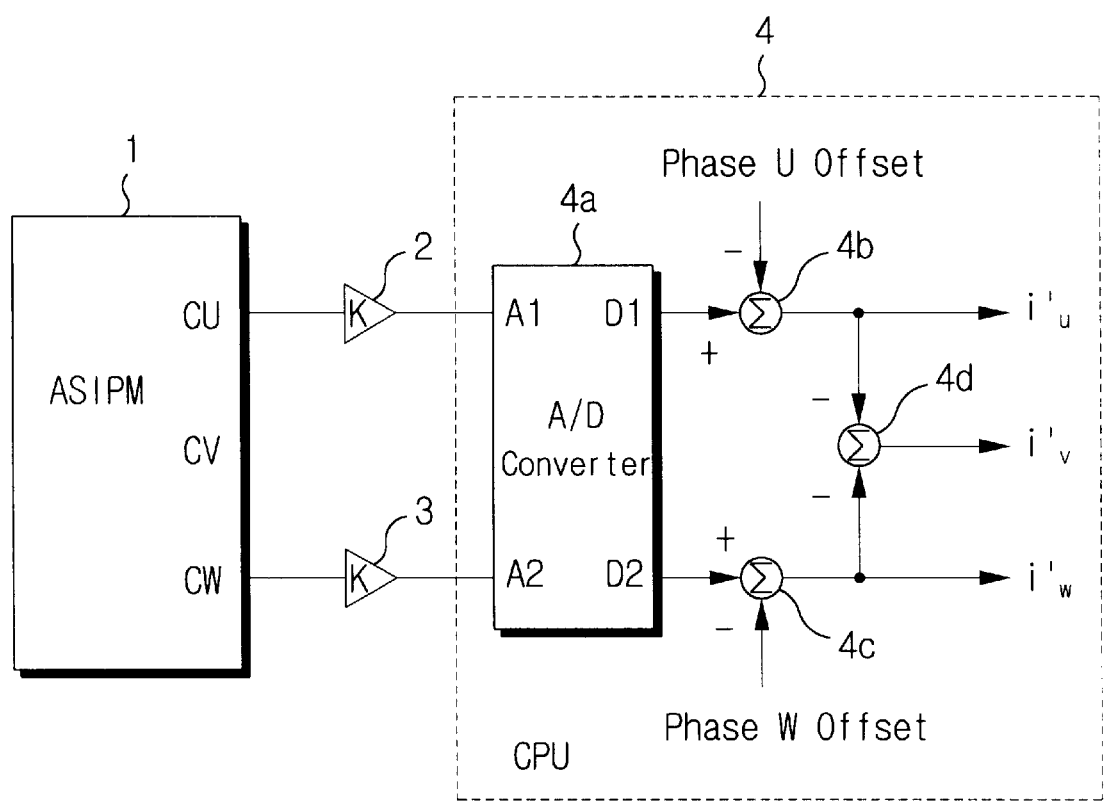
FIG. 1 is a schematic diagram of a conventional apparatus for eliminating variable offset values of current detecting signals.
Figure 2:
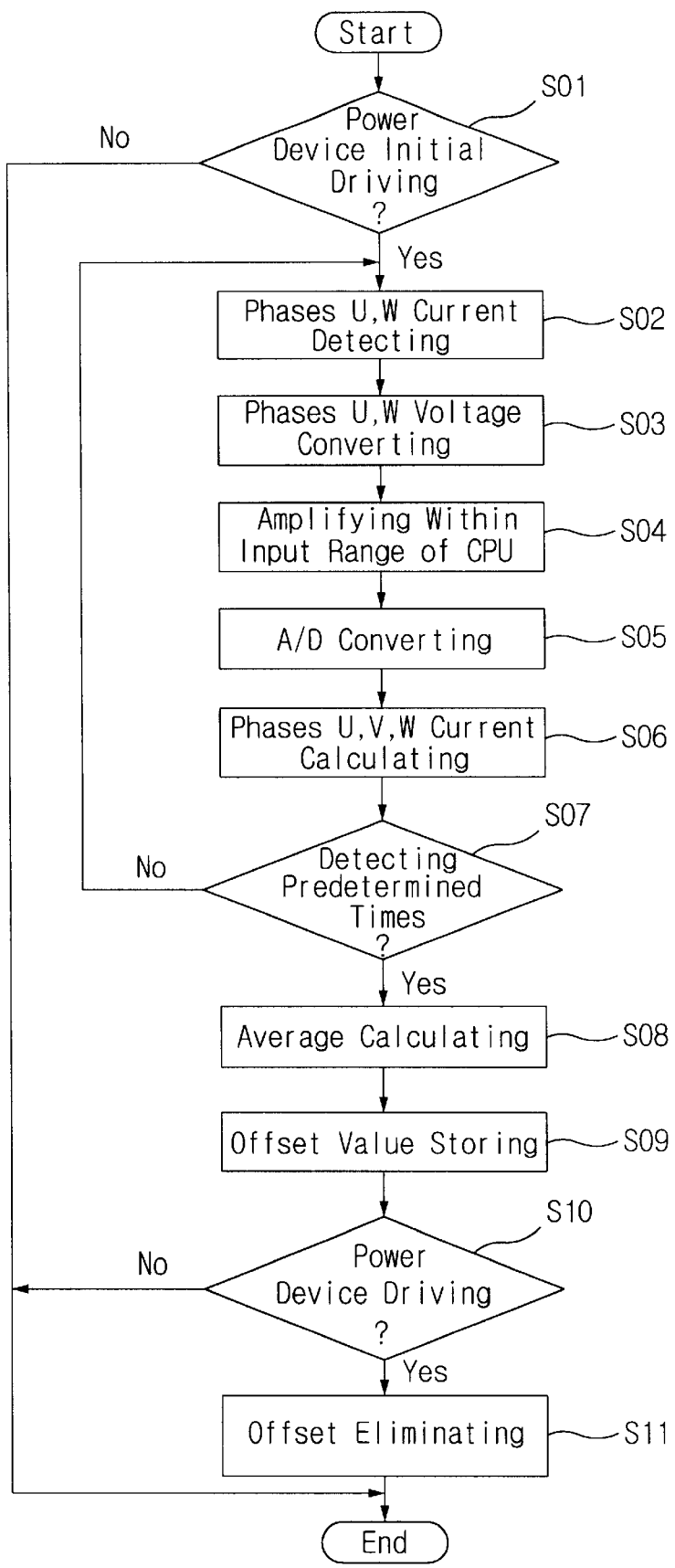
FIG. 2 is a flow chart of a conventional method for eliminating variable offset values of current detecting signals.
Figure 3:
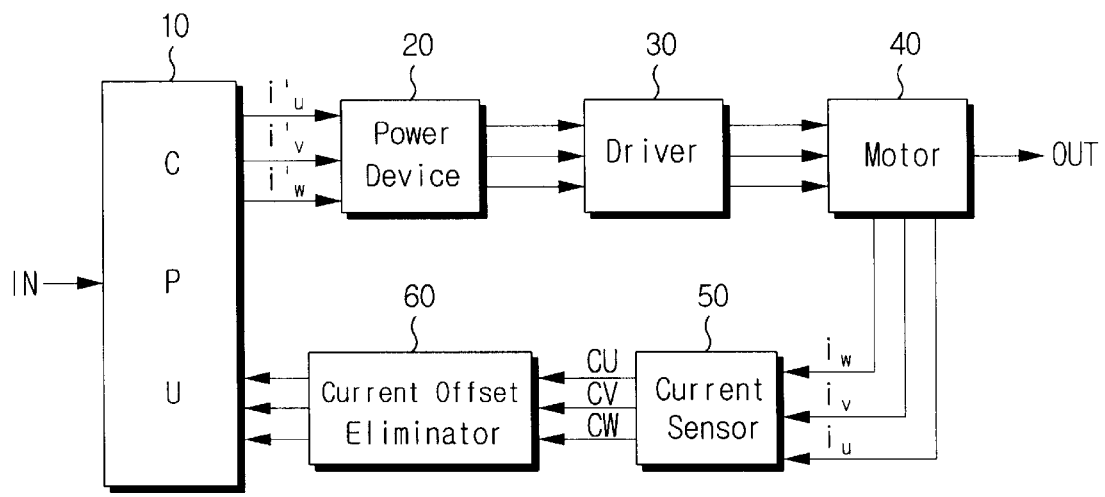
FIG. 3 is a block diagram of a control system of a three-phase AC motor having an apparatus for eliminating current offset elements.

FIG. 3 is a block diagram of a control system of a three-phase AC motor 40 having an apparatus for eliminating current offset elements. The AC motor control system has a driver 30 for driving the three-phase AC motor 40. The driver 30 contains a converter and an inverter. Power device 20 controls switching of the driver 30. Current sensor 50 detects the feedback of currents $i_u$, $i_v$ and $i_w$ from the three-phase AC motor 40, and outputs voltage detecting signals of the three current phases CU, CV and CW. An eliminating apparatus shown as current offset 60 detects offset elements contained in the voltage detecting signals of the three phases CU, CV and CW, and eliminates the detected offset elements. Central processing unit (CPU) 10 controls the eliminating apparatus of current offset, and outputs the offset eliminated current of the three-phases to the power device 20. Thus, the control system of the three-phase AC motor 40 shown in FIG. 3 eliminates current offset elements.

The apparatus for eliminating current offset elements 60 may, for instance, comprise differential amplifiers and one or more digital/analog converters. The differential amplifiers amplify the difference of an analog feedback offset signal outputted from the CPU 10 and the voltage detecting signals containing offset elements. The digital/analog converter converts a PWM wave outputted from the CPU 10 into the analog offset signal.

The CPU 10 has a first adder for adding the digital signals being outputted from the means for converting analog signals into digital signals. The CPU 10 also has a second adder for subtracting an output of the first adding part from the predetermined offset command. The CPU 10 has a proportional plus integral controller which accompanies the proportional plus integral function for an output of the second adding part, and outputs a PWM waveform. A counter counts the pulse-width of the PWM waveform. The operations of the CPU 10 are the same as the above-described apparatus for eliminating variable offset of current detecting signals and its method.

Figure 4:
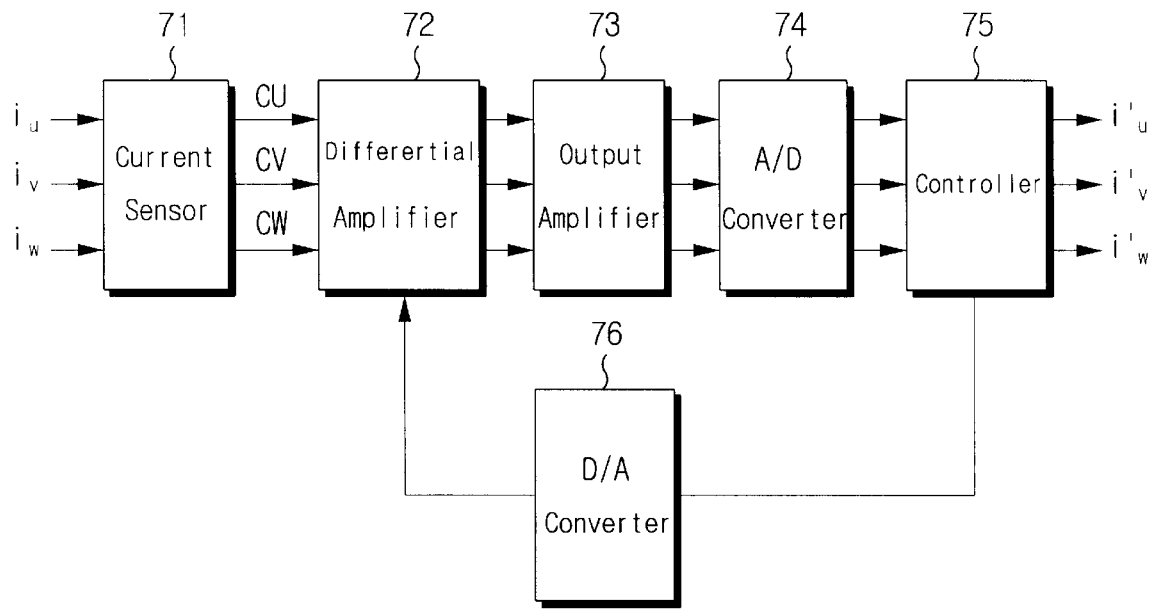
FIG. 4 is a block diagram of an apparatus for eliminating variable offset values of current detecting signals, according to the present invention.

FIG. 4 is a block diagram of an apparatus for eliminating variable offset values of current detecting signals, according to the present invention. The three-phase AC motor control system includes a current sensor 71 for detecting feedback current phases $i_u$, $i_v$, $i_w$ from the three-phase AC motor, and for converting the feedback current into voltage detecting signals CU, CV, CW containing offset elements. The three-phase AC motor control system also has differential amplifiers 72 for differentially amplifying feedback analog offset signals and the voltage detecting signals CU, CV, CW containing the offset elements. Output amplifiers 73 amplify the differentially amplified voltage detecting signals associated with the three phases in order to fit within the input range of analog/digital converter 74. The analog/digital converter 74 converts the amplified analog signals of three-phase into digital signals. Controller 75 sums the digital signals into a digital offset value and compares the digital offset value with a predetermined offset command. The controller 75 control part achieves a proportional plus integral transform function, according to the compared result. The controller 75 then outputs a digital offset signal of a PWM waveform. Digital/analog converter 76 converts the digital offset signal into an analog offset signal, and provides the analog offset signal as feedback to the differential amplifiers 72.

Figure 5:
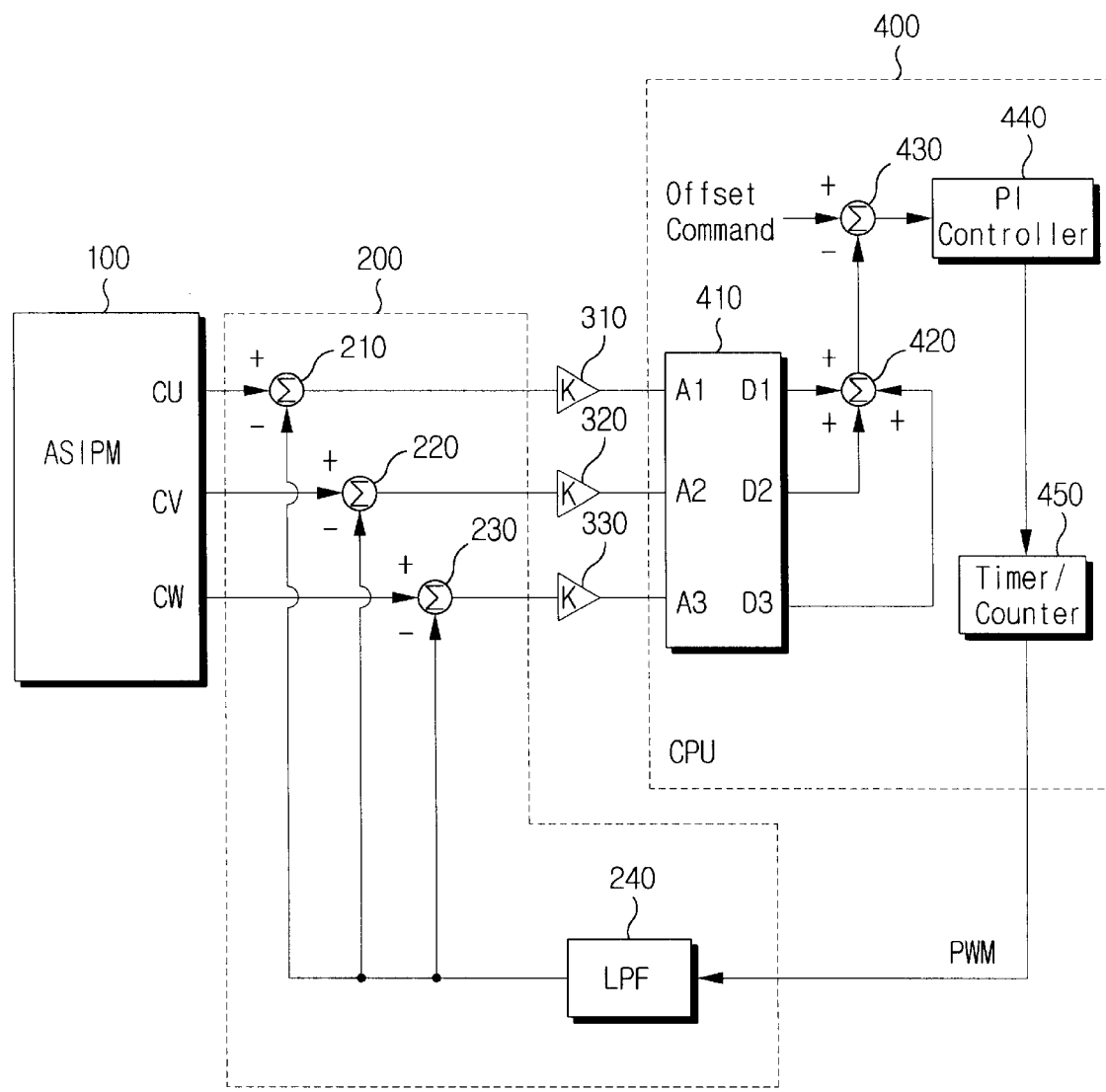
FIG. 5 is a detailed schematic diagram of an apparatus for eliminating variable offset values of current detecting signals, according to one embodiment of the present invention.

FIG. 5 is a detailed schematic diagram of an apparatus for eliminating variable offset values of current detecting signals according to an embodiment of the present invention. The current sensor 71 of FIG. 4, which detects feedback current phases of a three-phase AC motor, may be implemented as a function of ASIPM 100 of FIG. 5. In addition to sensing current, the ASIPM 100 may also function as a power device for supplying power to the AC motor.

The differential amplifiers 72 of FIG. 4 may be embodied in FIG. 5 as first, second, and third differential amplifiers, labeled 210, 220, 230, respectively. The differential amplifiers 210, 220, 230 represent amplifiers or buffers for symmetrically connecting two amplifying devices (for instance, transistors) having the same characteristics, to acquire an output in proportion to the difference of both inputs. The differential amplifiers 210, 220, 230 may provide some buffering or setoff effect from power source fluctuations, temperature changes, or the like.

The differential amplifiers 210, 220, 230 may be implemented, for instance, using operational amplifiers. Use of operational amplifiers enables easy adjustment of $V_{offset}$. In one embodiment of the present invention, a common value for $V_{offset}$ may be used for all the current detecting signals. Regarding the adjustment of $V_{offset}$, current detecting signals within a range of $V_{offset}=1.1V$ may be changed to current detecting signals within a range of 2.5V±2.5V feeding into the input of the analog/digital converter 410, for instance. Such a setting may be achieved by setting a gain of each operational amplifier to 2.5/1.1, or approximately 2.273. Since a gain of the current detecting signal is fixed to the range of ±2.5V from the range of ±1.1V, a final output voltage may be set to 2.5V by controlling the offset element as the detecting signals are processed.

The output amplifiers 73 of FIG. 4 may be embodied in FIG. 5 as first, second, and third output amplifiers, labeled 310, 320, 330, respectively. Consistent with the operation of the output amplifiers 73, the first, second, and third output amplifiers 310, 320, 330 amplify the differentially amplified voltage detecting signals to fit within the input range of CPU 400.

The functions of the analog/digital converter 74 and the controller 75 control part of FIG. 4 may be embodied as analog/digital converter 410 of FIG. 5 and other elements embedded within the CPU 400. For instance, the controller 75 may be implemented by the first and second adders 420 and 430, a proportional plus integral (PI) controller 440, and a timer/counter 450.

According to one exemplary embodiment, the analog/digital converter 410 may be characterized, for instance, as having 10 bits, 8 channels and unipolar mode whose input range is from 0V to 5V. In this exemplary embodiment, the digital converter value for each phase will exist within the range of 0 to 1023, and the sum of the digital converted signals of three current phases should be 1,536 (=512×3). That is, when the number of used bits is n, the sum of the digital converted signals of three phases must be $(3/2 \times 2^n)$ If a process for eliminating offset is managed improperly, the sum of the digital converted signals of three-phase may be different than the above-described exemplary embodiment. If the mode of the analog/digital converter is a bipolar mode, the sum of the digital converted signals of three current phases will be zero. The PI controller 440 may be embodied as a closed loop using the above-described characteristics. The PWM output value of the PI controller 440 must be converted into an analog offset value so that it may be filtered by the low pass filter 240. Accordingly, in the preprocessing operation of the current detecting signals, the sum of the digitally converted signals of the three phases should be 1,536.

The analog/digital converter 410 may alternatively be adapted for operation in a bipolar mode. However, since circuits operating in a unipolar mode often have lower manufacturing costs, the analog/digital converter 410 is preferably embodied in the unipolar mode.

The digital/analog converter 76 may be implemented as a low-pass filter 240 capable of converting digital signals into analog signals by low-pass filtering the PWM waveform being outputted by the PI controller 440. The low-pass filter 240 may be embodied in the form of a filter amplifier. The low-pass filter 240 provides feedback current data to the analog/digital converter 410 of the CPU 400, to eliminate offset elements. Alternatively, high performance servo drivers or high performance inverters may contain analog/digital converters for feedback of the current detecting signals.

In an alternative embodiment, the present invention may be configured to include an external apparatus 200 containing the first, second, third differential amplifiers 210, 220, 230, and the low-pass filter 240. The low-pass filter 240 may be a filter amplifier having a predetermined gain characteristic and frequency response (e.g., bond pass area and a cutoff frequency. Alternatively, the filter amplifier embodying the low-pass filter 240 may be represented as a function with a predetermined amplitude/phase-response as a function of frequency.

Figure 9:
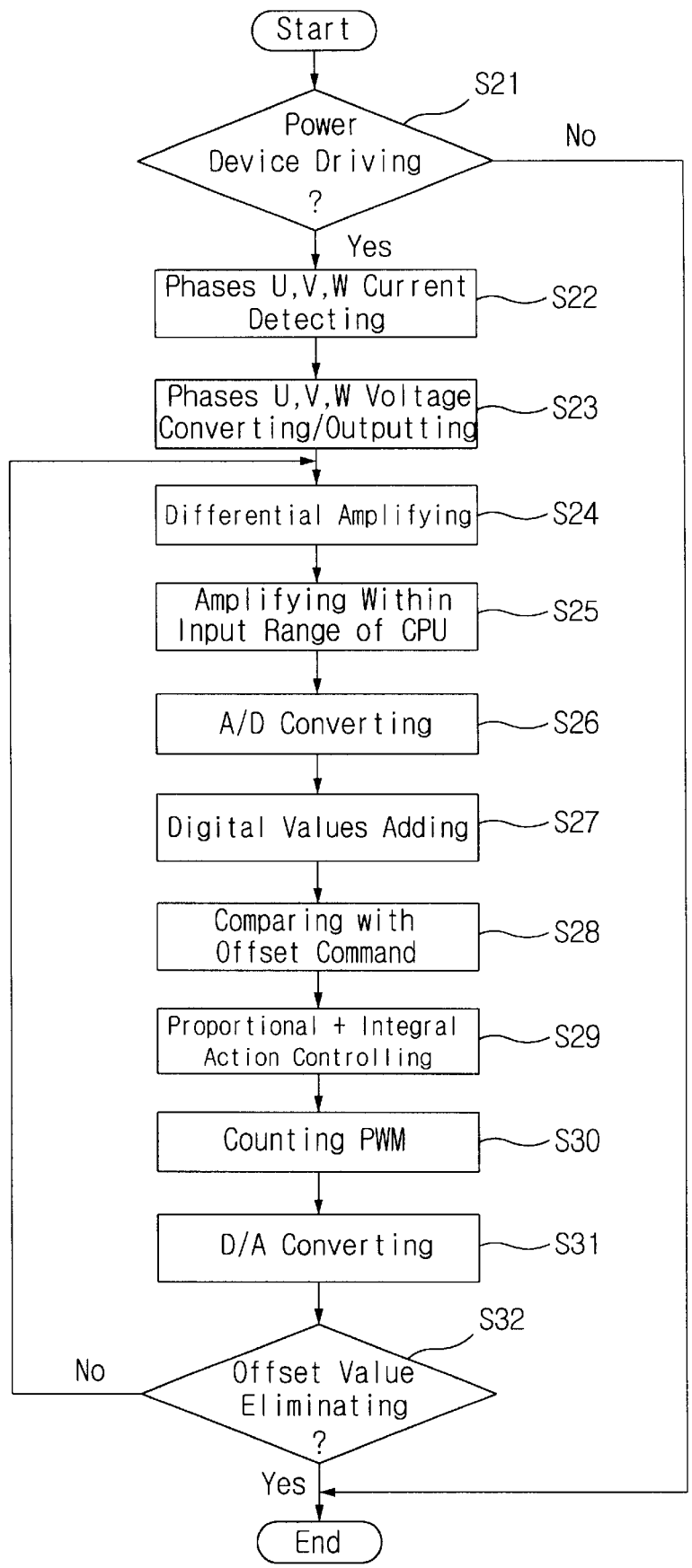
FIG. 9 is a flow chart of a method for eliminating variable offset values of current detecting signals, according to an embodiment of the present invention.

FIG. 9 is a flow chart of a method for eliminating variable offset values of current detecting signals according to an embodiment of the present invention. The steps of the method depicted in FIG. 9 will be explained throughout the ensuing description with reference to the apparatus structure shown in FIG. 5.

Step S21 determines whether the ASIPM 100 is being driven in response to the operation of a three-phase AC motor. If the ASIPM 100 is not being driven, the S21 step proceeds to the end of the method, otherwise the method proceeds to step S22. In step S22 the current and associated phases U, V and W of feedback signals are detected, and the method proceeds to step S23. In step S23 the current and associated phases U, V and W are converted into voltage detecting signals containing offset elements, or current detecting elements. As an exemplary phase convention for making phase measurements, the phase of signals entering the three-phase AC motor are typically defined to be zero at the input of the three-phase AC motor.

Figure 6:
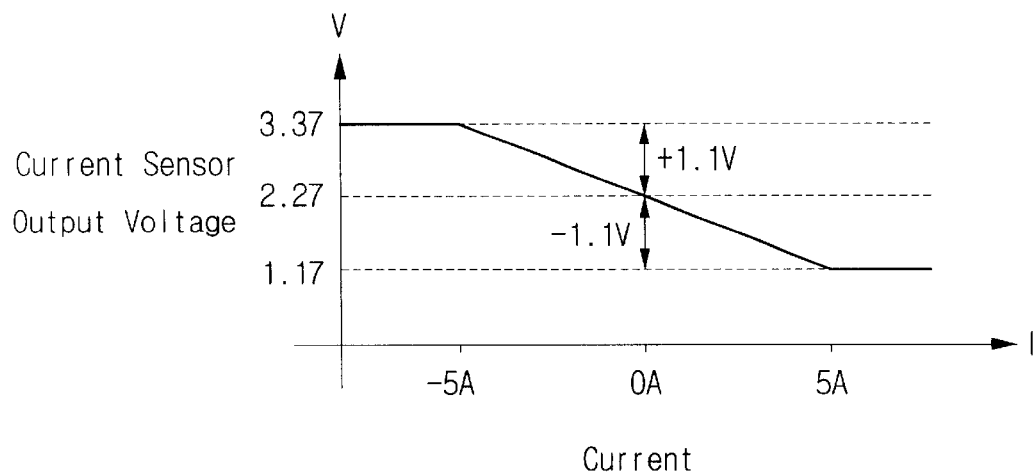
FIG. 6 depicts a relation between detecting current and output voltage of a current sensor, according to an embodiment of the present invention.

FIG. 6 depicts the relation between detected current and output voltage of a current sensor, according to an embodiment of the present invention. As current detected by the current detector varies from −5A to 5A, the output voltage of the current detector changes from 3.37V to 1.17V (2.27+/−1.1V $V_{offset}$). Table 1 reflects the output voltage corresponding to various levels of detected current.

TABLE 1

| Detected Current: | −Rated current = −5 A | 0 | +Rated current = +5 A |
|---|---|---|---|
| Output Voltage: | $V_{offset} = -1.1\ V$ | $V_{offset}$ | $V_{offset} = 1.1\ V$ |

In an exemplary embodiment, $V_{offset}$ may be set to 2.27V for the output voltage of the ASIPM 100. $V_{offset}$ may, however, be changed to any value from a minimum of 1.87V to a maximum of 2.57V to adjust to various device characteristics or operating environments. In addition, it should be noted that the ASIPM 100 produces three-phase voltage outputs in proportion to the three current phases, according to the relationship reflected in Table 1.

Accordingly, a decrease in performance may result unless the effect of $V_{offset}$ the offset element embedded within the output-voltage, is eliminated. The performance decreases due to $V_{offset}$ may include, for instance, increases in torque ripple, a reduction of the maximum torque, or the like.

Therefore, to properly control the above-described variable output voltage, the present invention should be carefully adjusted to the output signal of an initial status as well as an operating status in the range of 2.5V±2.5V (that is, 0V to 5V).

For controlling the current offset signals, situations may arise in which output signals are needed at an output range from 1.87V to 2.57V. If a D/A converter 76, as shown in FIG. 4, is embedded in such a circuit, these voltage ranges may easily be achieved. Unfortunately, if a commercial CPU is being used for the CPU 400, it is unlikely to have an embedded D/A converter. One way of solving this problem is to install a D/A converter external to the CPU 400. However, installing an external D/A converter may be relatively expensive. Accordingly, if an external D/A converter is required, it is preferred that the desired analog voltage be acquired by using a low pass filter 240, as shown in FIG. 5, with an operational amplifier at the output of the PWM. Since many commercial CPU products contains embedded timer/counters, the embodiment of the present invention will preferably use an embedded timer/counter, but may alternatively be configured with an external timer/counter 450.

In one embodiment of the present invention, a common value for $V_{offset}$ may be used for each of the three current detecting signals of the ASIPM 100. In a preprocessing operation, since a gain of the current detecting signal is fixed to the range of ±2.5V from the range of ±1.1V, a final output voltage signal for current phase 0A can be set to 2.5V by controlling the offset element as the detecting signals are processed.

With reference to FIG. 9 again, in step S24 the feedback signal of an analog offset signal and the voltage detecting signals are differentially amplified, and are outputted. The method proceeds to step S25 where the outputs of signals U, V, and W, are amplified so as to fit within an input range of the CPU 400. Then, in step S26 each current detecting signal, that is, each voltage detecting signal containing an offset element, is converted into digital values by the analog/digital converter 410. Following step S26, the digital converted signals are added, in step S27, and then in step S28 a digital offset element is calculated on the basis of a predetermined offset command. After a proportional plus integral function according to the digital offset element is realized, a digital offset signal is outputted, in step S29.

Figure 7:
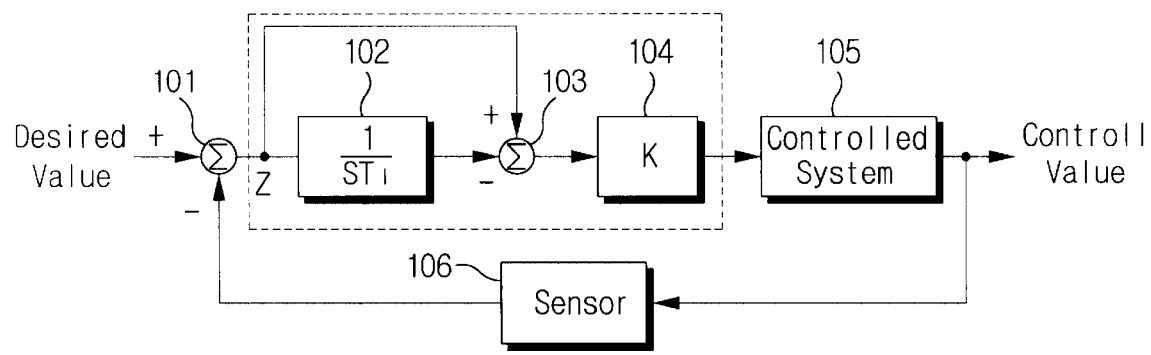
FIG. 7 depicts a functional block diagram for producing a proportional plus integral function, according to various embodiments of the present invention.

FIG. 7 depicts a functional block diagram for producing a proportional plus integral function. In practice, such a proportional plus integral function may typically be performed within the PI controller 440, within the CPU 10 or within another CPU, according to various embodiments of the present invention. One embodiment of a conventional proportional plus integral function system includes a first adder 101, an integral part 102, a second adder 103, a proportional gain part 104, a controlled system 105, and a sensor 106, arranged, for instance, as shown in FIG. 7.

The first adder 101 subtracts a detected value from a desired value, and outputs the differential Z. The integral part 102 performs the transfer function $1/ST_I$, thus, integrating the signal. $T_I$ is an integration time constant of the integral part 102. The second adder 103 subtracts an output of the integral part 102 from the differential Z. Next, the proportional gain part 104 amplifies the signal by a gain constant K, and outputs an operating value. K is the proportional gain constant of the proportional gain part 104. Accordingly, the controlled system 105, controlled by the operating value output from proportional gain part 104, outputs a control value. The sensor 106 detects the control value output from controlled system 105, and feeds back the signal to the first adder 101.

Generally, the proportional plus integral function depicted in FIG. 7 represents the proportional function of a proportional gain part 104, the integral function of integral part 102, plus the control aspects of the controlled system 105. The proportional plus integral function produced by the FIG. 7 arrangement is a control function which is useful in a system characterized by a vestigial deviation of zero. The control function of the proportional plus integral function should preferably not be used in a system characterized by an abruptly changing input. In an alternative embodiment, if elimination of offset elements through use of the proportional plus integral function of FIG. 7 is found to be inadequate for the operation of a system, a derivative function based on the additional error terms may be added to the proportional plus integral function. The function would then become a proportional plus integral plus derivative function.

The PI controller 440 may, for instance, be implemented as a function within the CPU 400. The PWM waveform then becomes an operating value outputted from the proportional gain part 104, and is converted into an analog signal by the low pass filter 240.

With reference to FIG. 9 again, in step S30 the PWM waveform is counted by a timer/counter 450 embedded within the CPU 400, and the method proceeds to step S31. In step S31 the digital offset signal is converted into the analog offset signal, and proceeds to step S32. As part of step S32, it is determined whether the ASIPM 100 is being driven. If the ASIPM 100 is not being driven, the method returns to step S24, feeding back the signals for differential amplification by the amplifiers 210, 220 and 230, for further offset value eliminating, if required. If the ASIPM 100 is being driven, the method ends.

Figure 8:
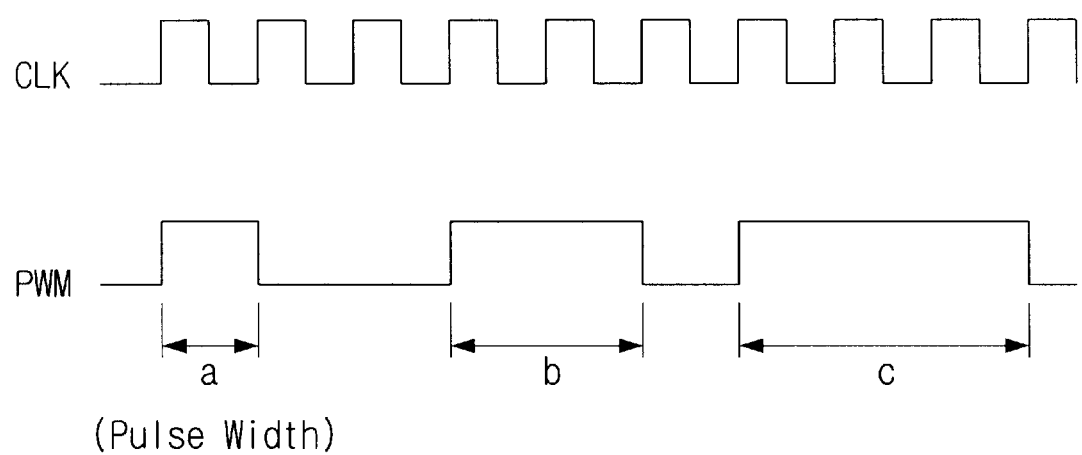
FIG. 8 depicts a PWM waveform, according to an embodiment of the present invention.

FIG. 8 depicts the PWM waveform according to an embodiment of the present invention. The PWM waveform outputted from the PI controller 440 is counted by the timer/counter 450. The timer/counter 450 may be embedded within the CPU 400, for instance, in conjunction with a system clock CLK. The PWM waveform is then converted into an analog signal by the low-pass filter 240. FIG. 8 shows that a, b, and, c are pulse widths of 1 CLK, 2 CLK, and 3 CLK, respectively.

In general, a PWM circuit (not shown) represents a circuit in which a pulsewidth varies according to an amplitude of a signal wave. The signal wave is added to a sawtooth wave by an adder circuit, and the added wave is cleaved to thin waves by a slicer. The signal amplified/outputted by the slicer is the PWM wave. Among limiter circuits, the slicer may be a circuit which cleaves thin waves, reducing them by a difference of each particular level.

In an analog conversion, an analog signal is sampled for a predetermined periodic sampling time, and is digitalized according to the sampling. In such case, a low pass filter may be used having a cutoff frequency beyond one and one-half the sampling frequency to reduce noise caused by an aliasing effect. In a digital conversion the low pass filter may also be needed to eliminate nonessential or unwanted noises, so as to regenerate a correct analog wave. That is, the low pass filter can be used as part of a D/A converter.

Accordingly, commercial microcontrollers and CPUs may have an embedded A/D converter with three channels, a D/A converter, or a timer/counter capable of acquiring a PWM output instead of the digital/analog converter. In such a microcontroller or CPU, the present invention may be implemented using four operational amplifiers, thus, lowering the manufacturing costs. In the case of the commercial microcontrollers or CPUs with only two channels, an A/D converter with one more channels may additionally be needed.

Therefore, the present invention, as disclosed herein, may advantageously operate without arithmetic operations of the CPU for eliminating current offset elements. In addition, the present invention can scale and shift to a desired reference level since offset elements are contained in current detecting signals. The present invention also adapts a proportional plus integral controller in the CPU for controlling offset elements.

The present invention can be used when $V_{offset}$ value is changed voluntarily in current detecting signals of the ASIPM device, and can be used regardless of a resolution of the analog/digital converter. The present invention may be used in either a mode of unipolar or bipolar. The present invention can be adopted when offset elements of current detecting signals exist and vary greatly in any current detectors.

The present invention may be used to adjust a current detecting signal to a desired level of signal even though the offset element contained within the detecting signal (e.g., a current detecting signal) of the ASIPM changes variably.

In addition to continuously changing the $V_{offset}$, the present invention may controllably vary the current detecting signal within a range of 0V to 5V, regardless of any tuning off-line operation by the proportional plus integral controller embedded within the CPU. Accordingly, the present invention does not require hand controlled offset operation when products are introduced, and can prevent a lowering of performance due to a changed $V_{offset}$, even in a long time operation of the AC motor.

Accordingly, the present invention is useful for various control circuits of a motor such as a servo driver, an inverter, or the like.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. An apparatus for eliminating variable offset values of current detecting signals comprising:

means for detecting feedback current from an AC motor, and for converting said feedback current into voltage detecting signals containing offset elements;

means for differentially amplifying a feedback analog offset signal and said voltage detecting signals;

means for converting said differential amplified analog signals into digital signals;

a control means for adding up said digital signals to a digital offset value and for comparing said digital offset value with a predetermined offset command, wherein the control means applies a proportional plus integral function to said compared result and outputs a digital offset signal of a pulse-width modulation waveform; and means for converting said digital offset signal into said analog offset signal, and for providing a feedback loop of said analog offset signal to said means for differential amplifying.

2. The apparatus for eliminating variable offset values of current detecting signals of claim 1, wherein said means for detecting current is an Application-Specific Intelligent Power Module.

3. The apparatus for eliminating variable offset values of current detecting signals of claim 1, wherein said means for differentially amplifying comprises:

differential amplifiers for differentially amplifying said analog offset signal and three-phase voltage detecting signals; and output amplifiers for amplifying said differentially amplified signals to fit within an input range of said control means.

4. The apparatus for eliminating variable offset values of current detecting signals of claim 3, wherein said differential amplifiers comprises:

a first differential amplifier for differentially amplifying said analog offset signal and a signal of phase U among said three-phase voltage detecting signals;

a second differential amplifier for differentially amplifying said analog offset signal and a signal of phase V among said three-phase voltage detecting signals; and a third differential amplifier for differentially amplifying said analog offset signal and a signal of phase W among said three-phase voltage detecting signals.

5. The apparatus for eliminating variable offset values of current detecting signals of claim 1, wherein said means for converting is embedded in said control means.

6. The apparatus for eliminating variable offset values of current detecting signals of claim 1, wherein said control means comprises:

a first adding part for adding up said digital signals being outputted from said means for converting;

a second adding part for subtracting an output of said first adding part from said predetermined offset command;

a proportional plus integral controller for applying said proportional plus integral function to an output of said second adding part, and for outputting said pulse-width modulation waveform; and a counter for counting a pulse-width of said pulse-width modulation waveform.

7. The apparatus for eliminating variable offset values of current detecting signals of claim 1, wherein said predetermined offset command is set by $(3/2 \times 2^n)$ if said means for converting operates in a unipolar mode, wherein n is a number of bits.

8. The apparatus for eliminating variable offset values of current detecting signals of claim 1, wherein said predetermined offset command is set to 0 if said means for converting operates in a bipolar mode.

9. The apparatus for eliminating variable offset values of current detecting signals of claim 6, wherein said proportional plus integral controller comprises:

a proportional function part for changing an operating value in proportion to said offset elements; and an integral function part for setting a new operating value, to add to said proportional function, by adding a changed value in proportion to an integral value of said offset value.

10. The apparatus for eliminating variable offset values of current detecting signals of claim 1, wherein said means for converting is a filter amplifier for low-pass filtering of said pulse-width modulation waveform which is counted by a counter in said control means.

11. The apparatus for eliminating variable offset values of current detecting signals of claim 10, wherein said filter amplifier integrates said filtered pulse-width modulation waveform and converts it into said analog offset signal.

12. In a three-phase AC motor, an apparatus for eliminating variable offset values of current detecting signals comprising:

a current detector for detecting feedback current from said three-phase AC motor, and for converting said feedback current into voltage detecting signals containing offset elements;

differential amplifiers for differentially amplifying an analog offset signal and said voltage detecting signals;

output amplifiers for amplifying said differentially amplified voltage detecting signals to fit within an input range for controlling;

an analog/digital converter for converting said amplified signals into digital signals;

a control part for adding up said digital signals to a digital offset value and for comparing said digital offset value with a predetermined offset command, wherein the control part applies a proportional plus integral function to said compared result and outputs a digital offset signal of a pulse-width modulation waveform; and a digital/analog converter for converting said digital offset signal into said analog offset signal, and for providing a feedback loop of said analog offset signal to said differential amplifiers.

13. The apparatus for eliminating variable offset values of current detecting signals of claim 12, wherein said differential amplifiers comprise:

a first differential amplifier for differentially amplifying said analog offset signal and a signal of phase U among said three-phase voltage detecting signals;

a second differential amplifier for differentially amplifying said analog offset signal and a signal of phase V among said three-phase voltage detecting signals; and a third differential amplifier for differentially amplifying said analog offset signal and a signal of phase W among said three-phase voltage detecting signals.

14. The apparatus for eliminating variable offset values of current detecting signals of claim 12, wherein said digital/analog converter is a filter amplifier for low-pass filtering of said a pulse-width modulation waveform which is counted by a counter in said control part, wherein said filter amplifier integrates said low-pass filtered waveform and converts the integrated waveform into said analog offset signal.

15. A method for eliminating variable offset values of current detecting signals comprising:

a first step of detecting feedback current from an AC motor and converting said feedback current into voltage detecting signals containing offset elements;

a second step of differentially amplifying a feedback analog offset signal and said voltage detecting signals;

a third step of converting said differentially amplified analog signals into digital signals;

a fourth step of adding up said digital signals into a digital offset value, and comparing said digital offset value with a predetermined offset command, and applying a proportional plus integral function to said compared result, and outputting a digital offset signal of a pulse-width modulation; and a fifth step of converting said digital offset signal into said analog offset signal, and for providing a feedback loop of said analog offset signal to said second step.

16. The method for eliminating variable offset values of current detecting signals of claim 15, wherein said second step comprises:

a first substep of differentially operating said analog offset signal and three-phase voltage detecting signals containing said offset elements; and a second substep of amplifying said differentially operated signals to fit within an input range of a control means.

17. The method for eliminating variable offset values of current detecting signals of claim 15, wherein said fourth step comprises:

a first substep of adding said digital signals being outputted from said third step;

a second substep of subtracting an output of said first substep from said predetermined offset command;

a third substep of applying a proportional plus integral function to an output of said second substep, and outputting said pulse-width modulation waveform; and a fourth substep of counting a pulse-width of said pulse-width modulation waveform.

18. The method for eliminating variable offset values of current detecting signals of claim 15, wherein said predetermined offset command in said fourth step is set by $(3/2 \times 2^n)$, if an analog/digital converter for said third step operates in an unipolar mode, wherein n is a number of bits.

19. The method for eliminating variable offset values of current detecting signals of claim 15, wherein said predetermined offset command in said fourth step is set by 0, if an analog/digital converter for said third step operates a bipolar mode.

20. The method for eliminating variable offset values of current detecting signals of claim 17 wherein said third substep comprises:

a proportional function step for changing an operating value in proportion to said offset elements; and an integral function step for making a new operating value to add to said proportional function, by adding a changed value in proportion to an integral value of said offset value.

21. The method for eliminating variable offset values of current detecting signals of claim 15, wherein said fifth step of converting comprises low-pass filtering said pulse-width modulation waveform being counted by a counter, integrating said filtered waveform, and converting said integrated waveform into said analog offset signal.

* * * * *